(12) United States Patent
Figge et al.

(10) Patent No.: US 8,611,115 B2
(45) Date of Patent: Dec. 17, 2013

(54) RESONANT CAPACITOR CLAMPING CIRCUIT IN RESONANT CONVERTER

(75) Inventors: Heiko Figge, Medebach (DE); Frank Schafmeister, Warburg (DE)

(73) Assignee: DET International Holding Limited, Cayman-Inseln (KY)

( * ) Notice: Subject to any disclaimer, the term of this patent is extended or adjusted under 35 U.S.C. 154(b) by 250 days.

(21) Appl. No.: 13/016,646

(22) Filed: Jan. 28, 2011

(65) Prior Publication Data

US 2011/0255321 A1    Oct. 20, 2011

(30) Foreign Application Priority Data

Apr. 20, 2010 (EP) .................................. 10405083

(51) Int. Cl.
*H02H 7/122* (2006.01)
*H02M 3/335* (2006.01)

(52) U.S. Cl.
USPC .................... 363/56.02; 363/56.12; 363/21.02

(58) Field of Classification Search
USPC ......... 363/15–17, 21.01, 21.02, 21.03, 21.04, 363/97, 98, 132, 56.02, 56.12
See application file for complete search history.

(56) References Cited

U.S. PATENT DOCUMENTS

2007/0064451 A1    3/2007    Stanley

OTHER PUBLICATIONS

Yang, "Topology Investigation for Front End DC/DC Power Conversion for Distributed Power System", Faculty of the Virginia Polytechnic Institute and State University, Chapter 5, pp. 1-332, Sep. 12, 2003.

*Primary Examiner* — Bao Q Vu
*Assistant Examiner* — Zekre Tsehaye
(74) *Attorney, Agent, or Firm* — Birch, Stewart, Kolasch & Birch, LLP

(57) ABSTRACT

A resonant converter comprises first and second input terminals (1, 2) to connect a voltage source ($V_{Bulk}$). A series connection of a first switch ($S_1$) and a second switch ($S_2$) is connected between the input terminals. A resonant circuit with a resonant inductance, at least one resonant capacitor ($C_1$, $C_2$, $C_s$), and at least a primary winding of a transformer ($T_1$, $T_{1\_a}$, $T_{1\_b}$) is connected to the common Terminal of the first switch ($S_1$) and the second switch ($S_2$). A diode ($D_3$) is connected in conduction direction from the first input Terminal (1) to the clamping capacitor ($C_{clamp}$). Another diode ($D_4$) is connected in conduction direction from the clamping capacitor ($C_{clamp}$) to the second input terminal (2). A comparator (5) is connected across the clamping capacitor ($C_{clamp}$). The comparator (5) is further connected to a pulse control unit (3) to control the first and second switches ($S_1$, $S_2$).

20 Claims, 3 Drawing Sheets

RESONANT CAPACITOR CLAMPING CIRCUIT IN RESONANT CONVERTER

BACKGROUND OF THE INVENTION

1. Field of the Invention

The invention relates to a resonant converter, comprising a first and a second input terminal in order to connect a voltage source, wherein the first end of a first switch is connected to the first input terminal, wherein the second end of the first switch is connected to the first end of a second switch, wherein the second end of the second switch is connected to the second input terminal, wherein a first end of a resonant circuit comprising at least one resonant inductance, at least one resonant capacitor, and at least a primary winding of a transformer is connected to the second end of the first switch and to the first end of the second switch.

2. Description of the Related Art

Resonant converters, in particular LLC resonant converters, have a growing popularity due to their high efficiency, low level of EMI emissions, and ability to achieve high power density. Further advantages are small size, light weight and high efficiency.

Typical topologies of LLC resonant converters comprise half-bridge and full-bridge topologies. In a resonant tank or network, resonant inductors and resonant capacitors are arranged, wherein both serial and parallel topologies are known. In zero-voltage-switching (ZVS) or zero-current-switching (ZCS) topologies, high-frequency switching as well as minimized switching losses are of interest. LLC resonant converters operating at high frequency can improve the efficiency and reduce the size of the devices.

A requirement for many applications is a sufficient hold up time of the converter, such that in case of a power failure, full power output is maintained for a sufficiently long period, e.g. for about 20 ms to 50 ms.

Moreover, the converter has to be capable to operate safely and without damages in short circuit or overload conditions, i.e. in case of a short circuit of the output or higher than specified power consumption of a consumer connected to the output. Accordingly, the components of the converter, particularly the resonant capacitor, have to be protected from over voltage conditions which may occur in such overload or other conditions.

In a known half-bridge topology, a voltage source is connected to a pair of switches connected in series and a pair of resonant capacitors connected in series. A primary winding of a transformer is connected between the switches and the resonant capacitors. Such a topology is widely used for various applications.

In "Topology Investigation for Front End DC/DC Power Conversion for Distributed Power System", Bo Yang, 2003, Dissertation submitted to the Faculty of the Virginia Polytechnic Institute and State University, it is proposed to connect diodes in parallel to the resonant capacitors of the known half-bridge topology, in order to limit the resonant capacitor voltage and resonant current during overload or short circuit conditions of the output.

The output power region at which clamping of the resonant capacitor voltage occurs depends on the dimensioning of the resonant circuit elements. For reasonable design, the clamping should go into effect near above the rated output power. On the one hand this ensures best resonant current limiting and on the other hand this is the most efficient design considering partial load conditions. The higher the resonant capacitor voltage is set by design, the higher is the part load efficiency of the converter.

However, the described clamping method is disadvantageous for the boost characteristic of the converter used for hold up functionality. Because during hold up condition the bulk voltage is being decreased, the region of output power at which clamping of the resonant capacitor voltage occurs is expanded, which results in reduced hold up time in case of high output power.

SUMMARY OF THE INVENTION

It is the object of the invention to create a resonant converter pertaining to the technical field initially mentioned, that concurrently provides for limitation of the resonant capacitor voltage and the resonant current during overload or short circuit conditions as well as for improved hold up time in case of high output power.

The solution of the invention is specified by the features of claim 1. According to the invention,
  a) a third diode is connected in conduction direction from the first end of the first switch to the first end of a clamping capacitor,
  b) a fourth diode is connected in conduction direction from the second end of the clamping capacitor to the second end of the second switch,
  c) a comparator is connected to the first and second end of the clamping capacitor, and
  d) the comparator is connected to a pulse control unit in order to control the first and the second switch.

Such a resonant converter has the advantage that during normal operating condition, hence without a hold up condition, the clamping capacitor is charged via the third and fourth diode to the bulk voltage of the voltage source. When the bulk voltage decreases due to a hold up condition, the voltage of the clamping capacitor remains constant, hence the hold-up time is extended. In case of an overload condition the voltage of the resonant capacitor is clamped to the voltage of the clamping capacitor. Because energy is transferred to the clamping capacitor, the voltage of the clamping capacitor rises during overload condition. The pulse control unit is designed such that the switching frequency is increased at an overload condition causing the resonant current to be reduced and hence the clamping of the resonant capacitor to disappear.

Preferably the first end of a discharge unit is connected to the first end of the clamping capacitor and the second end of the discharge unit is connected to the second end of the clamping capacitor.

A discharge unit provides for resetting the voltage of the clamping capacitor and for reasonable operation of the resonant converter.

In a preferred embodiment, the discharge unit comprises a switch and a resistor which are connected in series.

A single resistor is a simple solution, but may be conflicting with low output power efficiency targets. Hence, the specific configuration of the discharge unit depends on a concrete specification for the short circuit behaviour of the power supply and may be developed for particular needs.

Preferably, at least one discrete inductor is connected in series to the primary winding in order to define the at least one resonant inductance. Hence, the resonant inductance is formed by two components of the circuit.

In a preferred embodiment, the at least one resonant inductance is defined solely by the magnetizing inductance of the primary winding of the transformer. Hence, no additional inductor is needed in order to form the resonant inductance.

Preferably, a first end of a first capacitor is connected to the first input terminal, the second end of the first capacitor is connected to the first end of a second capacitor, the second end of the second capacitor is connected to the second input terminal, a first diode is connected in conducting direction from the second end of the capacitor to the first end of the clamping capacitor, a second diode is connected in conducting direction from the second end of the clamping capacitor to the first end of the second capacitor, and the primary winding of the transformer, with optionally a discrete inductor connected in series, is/are connected between the second end of the first switch and the second end of the first capacitor as well as between the first end of the second switch and the first end of the second capacitor.

The first capacitor and the second capacitor may each have the same capacitance of half of the resonant capacitance $C_s/2$. Such a resonant converter has a half-bridge topology.

In a preferred embodiment, the first end of a third switch is connected to the first input terminal, the second end of the third switch is connected to the first end of a fourth switch, the second end of the fourth switch is connected to the second input terminal, and a second end of the resonant circuit comprising the at least one resonant inductance, the at least one resonant capacitor, and the at least one transformer is connected to the second end of the third switch and to the first end of the fourth switch, wherein the pulse control unit is arranged to control the third and the fourth switch.

Such a resonant converter has a full-bridge topology.

Preferably, a first subpart of the primary winding of the transformer, with optionally a first subpart of a discrete resonant inductor connected in series, is/are connected between the second end of the first switch as well as the first end of the second switch and the first end of the resonant capacitor, a second subpart of the primary winding of the transformer, with optionally a second subpart of a discrete resonant inductor connected in series, is/are connected between the second end of the resonant capacitor and the second end of the third switch as well as the first end of the fourth switch, a first midpoint diode is connected in conducting direction between the first end of the resonant capacitor and the first end of the clamping capacitor, a second midpoint diode is connected in conducting direction between the second end of the resonant capacitor and the first end of the clamping capacitor, a third midpoint diode is connected in conducting direction between the second end of the clamping capacitor and the first end of the resonant capacitor, and a fourth midpoint diode is connected in conducting direction between the second end of the clamping capacitor and the second end of the resonant capacitor.

Preferably, a discrete inductor is connected in parallel to the transformer respectively a discrete first subpart of an inductor is connected to the first subpart of the transformer and a discrete second subpart of an inductor is connected to the second subpart of the transformer in order to define the at least one resonant inductance. Such a discrete inductor allows for more flexibility when designing the resonant converter.

In a preferred embodiment, a capacitor is connected in parallel to the first and the second input terminal. Transients in the voltage source can therefore be suppressed in order to run the resonant converter in the desired operating point.

Other advantageous embodiments and combinations of features come out from the detailed description below and the totality of the claims.

DETAILED DESCRIPTION OF THE INVENTION

The drawings used to explain the embodiments show:

In the figures, the same components are given the same reference symbols.

PREFERRED EMBODIMENTS

Figure 1:
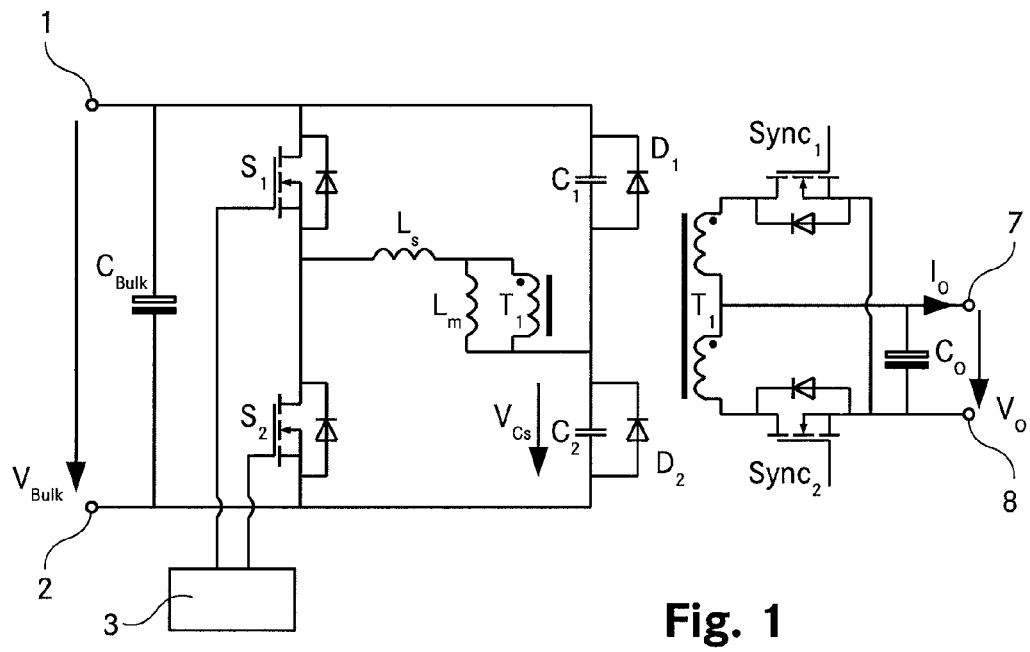
FIG. 1 shows a LLC resonant converter implementing the formerly known clamping scheme.

FIG. 1 shows a LLC resonant converter implementing the formerly known clamping scheme. A bulk voltage source $V_{Bulk}$ is connected to a first and a second input terminal 1, 2 of the LLC resonant converter. Between the first and second input terminal 1, 2, a bulk capacitor $C_{Bulk}$ is connected. A first end of a first switch $S_1$ is connected to the first input terminal 1 and a second end of the first switch $S_1$ is connected to a first end of a second switch $S_2$. A second end of the second switch $S_2$ is connected to the second input terminal 2. Hence, the first and the second switch $S_1$, $S_2$ are connected in series, and both are connected in parallel to the bulk capacitor $C_{Bulk}$ and the bulk voltage source $V_{Bulk}$. Further, again in parallel to the bulk capacitor $C_{Bulk}$ and the first and the second switch $S_1$, $S_2$, a first end of a first resonant capacitor $C_1$ is connected to the first input terminal 1, a second end of the first resonant capacitor $C_1$ is connected to a first end of a second resonant capacitor $C_2$. A second end of the second resonant capacitor $C_2$ is connected to the second input terminal 2.

Preferably, the first capacitor $C_1$ and the second capacitor $C_2$ each have the same capacitance $C_s/2$.

A first end of a resonant inductor $L_s$ is connected to the junction between the second end of the first switch $S_1$ and the first end of the second switch $S_2$. A second end of the resonant inductor $L_s$ is connected to a first end of a primary winding of a transformer $T_1$. A second end of the primary winding of the transformer $T_1$ is connected to the junction between the second end of the first resonant capacitor $C_1$ and the first end of the second resonant capacitor $C_2$.

According to FIG. 1, a magnetizing inductance $L_m$ is provided between the first end and the second end of the primary winding of the transformer $T_1$. The magnetizing inductance $L_m$ may either be provided by a discrete inductor connected in parallel to the primary winding of the transformer $T_1$ and/or the magnetizing inductance $L_m$ is the inductance resulting from the primary winding of the transformer $T_1$.

Between the second end of the first switch $S_1$ and the first end of the first switch $S_1$, a diode is connected in conducting direction. Between the second end of the second switch $S_2$ and the first end of the second switch $S_2$, another diode is connected in conducting direction. These diodes may be an integral part of the first or second switch $S_1$, $S_2$ or they may be connected as discrete components.

When a diode is connected between a first point and a second point in conducting direction, the diode is conducting a current from the first point to the second point and the diode is blocking a current from the second point to the first point.

Switches may be implemented as P-channel or N-channel MOSFET switches, wherein the source S forms a first respectively a second end of a switch and a drain D forms a second respectively a first end of a switch. A gate G of a switch is connected to a pulse-control unit 3 in order to control operation of the LLC resonant converter.

Between the second end of the first capacitor $C_1$ and the first end of the first capacitor $C_1$, a first diode $D_1$ is connected in conducting direction. Between the second end of the second capacitor $C_2$ and the first end of the second capacitor $C_2$, a second diode $D_2$ is connected in conducting direction.

On the secondary side, the transformer $T_1$ has a first and a second secondary winding connected in series. A second end of the first secondary winding and a first end of the second secondary winding are connected to the first output terminal 7. A first end of the first secondary winding is connected to a first end of a first synchronizing component $Sync_1$. A second end of the second secondary winding is connected to a first end of a second synchronizing component $Sync_2$. The second end of the first synchronizing component $Sync_1$ and the second end of the second synchronizing component $Sync_2$ are connected to a second output terminal 8. An output capacitor $C_O$ is connected between the first output terminal 7 and the second output terminal 8.

The first and the second synchronizing component $Sync_1$, $Sync_2$ may comprise a diode and/or a switch, for example a MOSFET switch. They are designed to rectify the currents induced in the first and second secondary windings and to provide a rectified output voltage $V_O$ to the first and second output terminal 7, 8.

Operation of the LLC resonant converter as shown in FIG. 1 is well known. The diodes $D_1$ and $D_2$ are intended to clamp the voltage of the first and second resonant capacitor $C_1$, $C_2$ to the bulk voltage $V_{bulk}$ at overload condition. The resulting effect is a limitation of the resonant capacitor voltage and a limitation of the resonant current during overload or short circuit condition at the first and second output terminal 7, 8.

Figure 2:
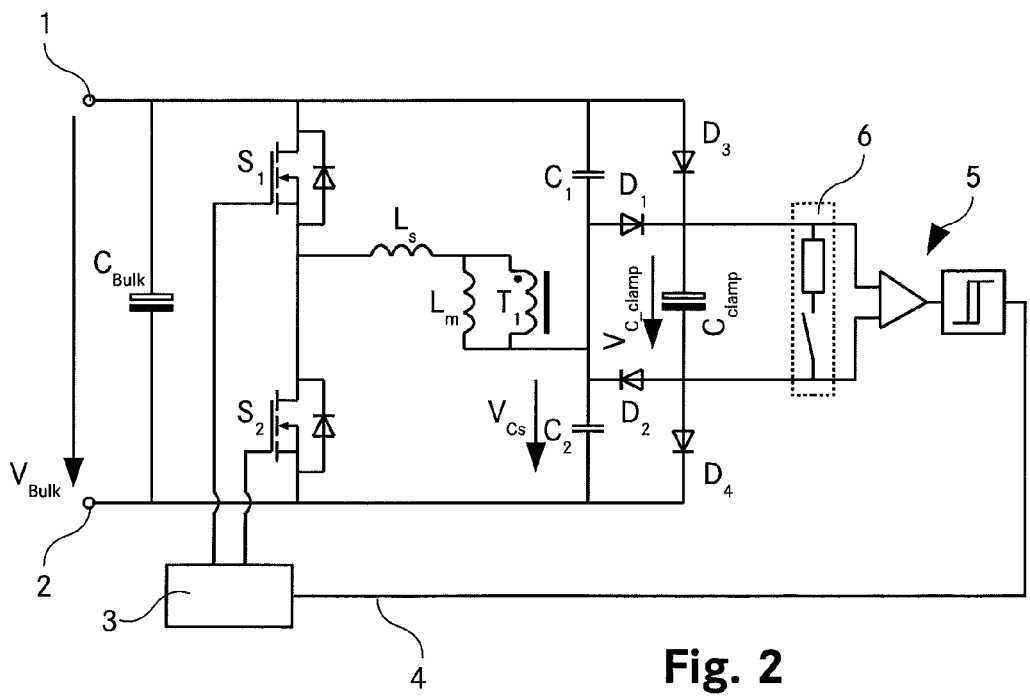
FIG. 2 shows the primary side of a LLC resonant converter according to the invention (half-bridge topology)

FIG. 2 shows the primary side of a LLC resonant converter implementing the clamping scheme according to the invention. The bulk voltage source $V_{Bulk}$, the bulk capacitor $C_{Bulk}$, the first and the second switch $S_1$, $S_2$, the resonant inductor $L_s$, the magnetizing inductance $L_m$, the primary winding of the transformer $T_1$, and the first and the second capacitor $C_1$, $C_2$ are arranged exactly as shown in FIG. 1. The resonant circuit of this LLC resonant converter comprises the resonant inductor $L_s$ and the first and the second capacitor $C_1$, $C_2$, wherein the first end of the resonant circuit is formed by the first end of the resonant inductor $L_s$. The secondary side of the LLC resonant converter with the secondary winding of the transformer $T_1$ is not shown in FIG. 2. Preferably, the first capacitor $C_1$ and the second capacitor $C_2$ each have the same capacitance $C_s/2$.

However, the first and second diodes $D_1$, $D_2$ are arranged differently, together with other components as follows.

The first diode $D_1$ is connected in conducting direction between the second end of the first capacitor $C_1$ and a first end of a clamping capacitor $C_{clamp}$. The second diode $D_2$ is connected in conducting direction between the second end of the clamping capacitor $C_{clamp}$ and the first end of the second capacitor $C_2$. A third diode $D_3$ is connected in conducting direction between the first end of the first capacitor $C_1$ and the first end of the clamping capacitor $C_{clamp}$. A fourth diode $D_4$ is connected in conducting direction between the second end of the clamping capacitor $C_{clamp}$ and the second end of the second capacitor $C_2$.

A comparator 5 is connected to the first and the second end of the clamping diode $C_{clamp}$. The comparator 5 is adapted to generate a pulse inhibit signal 4, which is fed to the pulse-control unit 3 in order to control the first and the second switch $S_1$, $S_2$.

For reasonable operation, a discharge unit 6 is connected between the first and the second end of the clamping capacitor $C_{clamp}$, in order to reset the voltage of the clamping capacitor $C_{clamp}$. A single resistor is a simple solution, but may be conflicting with low output power efficiency targets. Hence, the specific configuration of the auxiliary discharge unit 6 depends on a concrete specification for the short circuit behaviour of the power supply and may be developed for particular needs.

Figure 3:
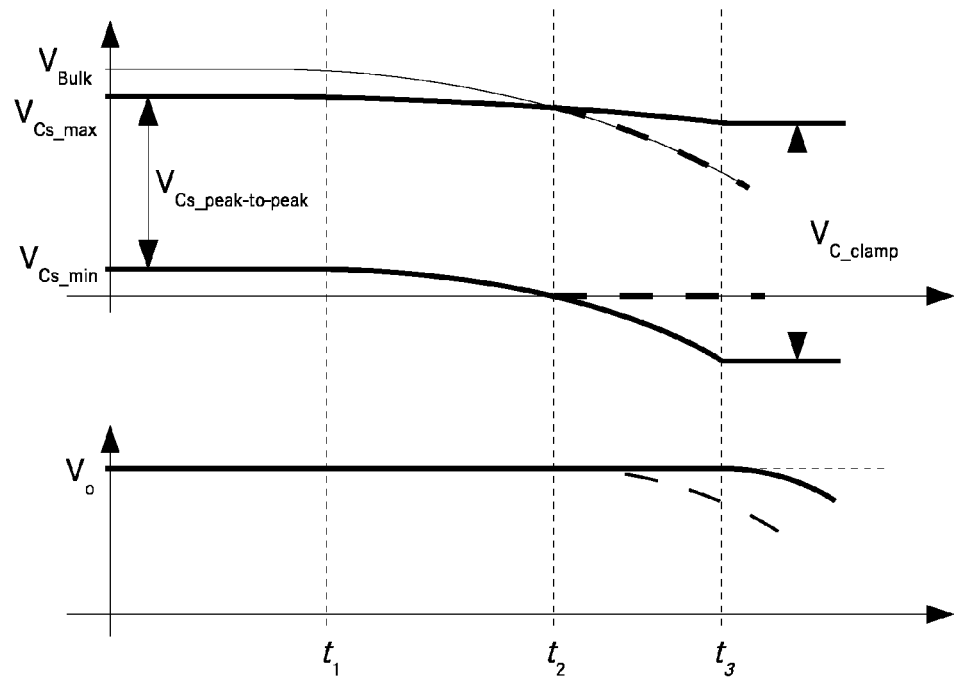
FIG. 3 shows qualitatively the waveforms during hold up condition of LLC resonant converters (according to the invention: solid lines; former clamping scheme: dashed lines)

FIG. 3 shows qualitatively the waveforms during hold up condition of a LLC resonant converter implementing the clamping scheme according to the invention (solid lines) and of a LLC resonant converter implementing the formerly known clamping scheme (dashed lines).

At $t_1$ the hold up condition occurs and the bulk voltage starts to decrease. At $t_2$ the clamping of the resonant capacitor voltage in the former clamping scheme begins and the output voltage $V_o$ starts to decrease (dashed lines). To overcome this drawback, the advanced clamping scheme according to the invention shown in FIG. 2 is proposed. Compared to the former clamping scheme shown in FIG. 1 the capacitor $C_{clamp}$ and the diodes $D_3$ and $D_4$ are added. Moreover an auxiliary discharge circuit and a comparator for generating a pulse inhibit signal are proposed for reasonable operation.

During normal operating condition, hence without a hold up condition, the capacitor $C_{clamp}$ is charged via $D_3$ and $D_4$ to the bulk voltage $V_{Bulk}$. When the bulk voltage $V_{Bulk}$ decreases due to a hold up condition, the voltage $V_{C\_clamp}$ of the clamping capacitor $C_{clamp}$ remains constant, hence the hold-up time is extended. In FIG. 3 the solid lines depict the characteristic of the clamping scheme according to the invention. The clamping of the resonant capacitor voltage $V_{Cs}$ is delayed until the voltage $V_{C\_clamp}$ of the clamping capacitor $C_{clamp}$ is reached at $t_3$. Only after $t_3$ the output voltage $V_o$ starts to decrease (solid line).

Figure 4:
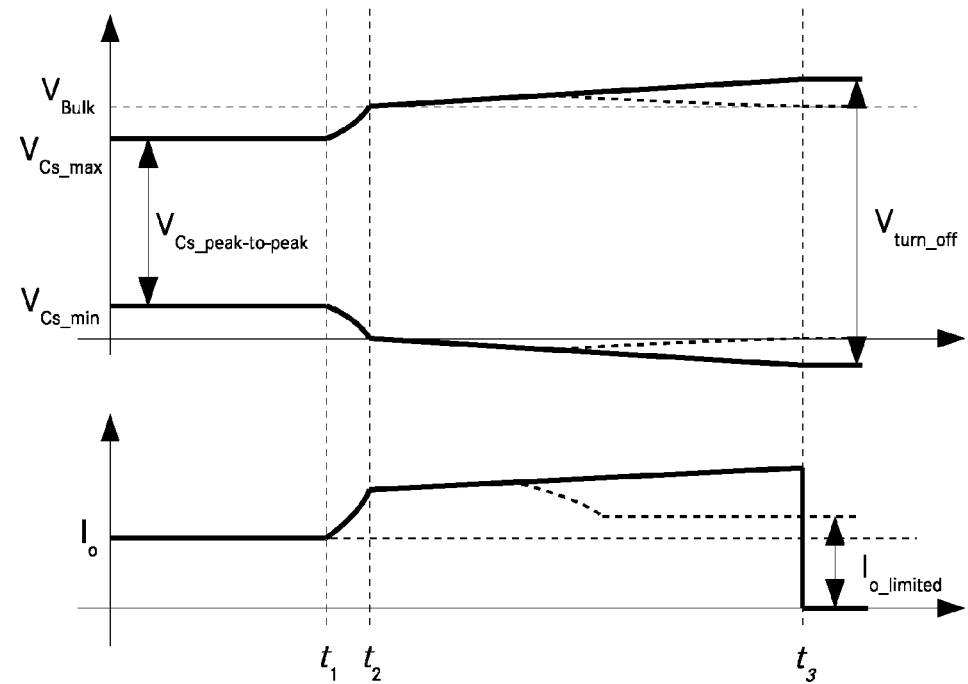
FIG. 4 shows the waveforms during overload condition of a LLC resonant converter according to the invention.

FIG. 4 shows the waveforms during overload condition of a LLC resonant converter according to the invention. The dashed lines relate to a properly working controller, whereas the solid lines relate to a malfunctioning controller.

In case of an overload condition, which starts at $t_1$ in FIG. 4, the resonant capacitor voltage $V_{Cs}$ is clamped to the voltage $V_{C\_clamp}$ of the clamping capacitor $C_{clamp}$ at $t_2$. Because energy is transferred to the clamping capacitor $C_{clamp}$, the voltage $V_{C\_clamp}$ of the clamping capacitor $C_{clamp}$ rises during overload condition. The pulse control unit (3) is designed such that the switching frequency is increased at an overload condition causing the resonant current to be reduced and hence the clamping of the resonant capacitor to disappear (cf. dashed lines in FIG. 4). The LLC resonant converter can change into normal operating condition immediately after the overload condition disappears. If the pulse control unit (5) is malfunctioning (cf. solid lines in FIG. 4), during overload condition the voltage $V_{C\_clamp}$ of the clamping capacitor $C_{clamp}$ increases steadily until it reaches the safety turn off threshold $V_{turn\_off}$ at $t_3$ triggering the pulse inhibit signal and setting the LLC resonant converter into error mode.

Figure 5:
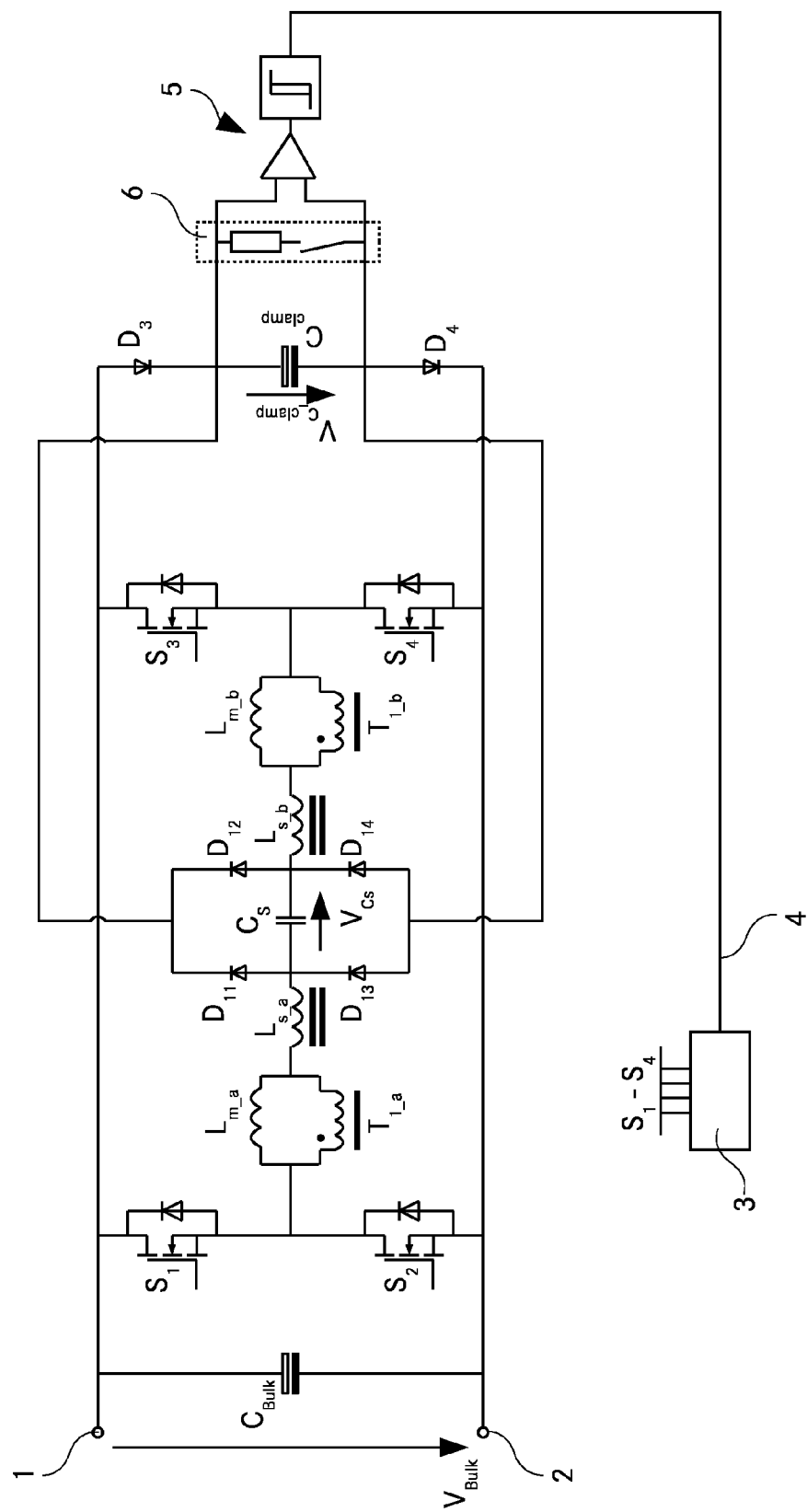
FIG. 5 shows the primary side of a LLC resonant converter according to the invention (full-bridge topology).

FIG. 5 shows the primary side of a full bridge topology of a LLC resonant converter implementing the clamping scheme according to the invention.

A bulk voltage source $V_{Bulk}$ is connected to a first and a second input terminal 1, 2 of the full bridge LLC resonant converter. Between the first and second input terminal 1, 2, a bulk capacitor $C_{Bulk}$ is connected.

A first end of a first switch $S_1$ is connected to the first input terminal 1 and a second end of the first switch $S_1$ is connected to a first end of a second switch $S_2$. A second end of the second switch $S_2$ is connected to the second input terminal 2.

A first end of a third switch $S_3$ is connected to the first input terminal 1 and a second end of the third switch $S_3$ is connected to a first end of a fourth switch $S_4$. A second end of the fourth switch $S_4$ is connected to the second input terminal 2.

A third diode $D_3$ is connected in conducting direction between the first end of the third switch $S_3$ (as well as the first input terminal 1) and the first end of a clamping capacitor $C_{clamp}$. A fourth diode $D_4$ is connected in conducting direction between the second end of the clamping capacitor $C_{clamp}$ and the second end of the fourth switch $S_4$ (as well as the second input terminal 2).

The first end of a first subpart of the primary winding of a transformer $T_{1\_a}$ is connected to the second end of the first switch $S_1$ and the first end of the second switch $S_2$. A first subpart of a magnetizing inductance $L_{m\_a}$ is provided between the first end and the second end of the first subpart of the primary winding of the transformer $T_{1\_a}$. The first subpart of the magnetizing inductance $L_{m\_a}$ may either be provided as a discrete first subpart of an inductor connected in parallel to the first subpart of the primary winding of the transformer $T_{1\_a}$ and/or the magnetizing inductance $L_{m\_a}$ is the inductance resulting from the first subpart of the primary winding of the transformer $T_{1\_a}$.

The second end of the first subpart of the primary winding of the transformer $T_{1\_a}$ is connected to the first end of a first subpart of a resonant inductor $L_{s\_a}$. The second end of the first subpart of the resonant inductor $L_{s\_a}$ is connected to the first end of a resonant capacitor $C_s$. The second end of the resonant capacitor $C_s$ is connected to the first end of a second subpart of a resonant inductor $L_{s\_b}$.

The first end of a second subpart of the primary winding of a transformer $T_{1\_b}$ is connected to the second end of the second subpart of the resonant inductor $L_{s\_b}$. A second subpart of a magnetizing inductance $L_{m\_b}$ is provided between the first end and the second end of the second subpart of the primary winding of the transformer $T_{1\_b}$. The second subpart of the magnetizing inductance $L_{m\_b}$ may either be provided as a discrete second subpart of an inductor connected in parallel to the second subpart of the primary winding of the transformer $T_{1\_b}$ and/or the magnetizing inductance $L_{m\_b}$ is the inductance resulting from the first subpart of the primary winding of the transformer $T_{1\_b}$.

In FIG. 5, the secondary side of the full bridge topology of a LLC resonant converter is omitted.

A first midpoint diode $D_{11}$ is connected in conducting direction between the first end of the resonant capacitor $C_s$ and the first end of the clamping capacitor $C_{clamp}$. A second midpoint diode $D_{12}$ is connected in conducting direction between the second end of the resonant capacitor $C_s$ and the first end of the clamping capacitor $C_{clamp}$.

A third midpoint diode $D_{13}$ is connected in conducting direction between the second end of the clamping capacitor $C_{clamp}$ and the first end of the resonant capacitor $C_s$. A fourth midpoint diode $D_{14}$ is connected in conducting direction between the second end of the clamping capacitor $C_{clamp}$ and the second end of the resonant capacitor $C_s$.

A comparator 5 is connected to the first and the second end of the clamping diode $C_{clamp}$. The comparator 5 is adapted to generate a pulse inhibit signal 4, which is fed to the pulse-control unit 3 in order to control the first, second, third and fourth switch $S_1$-$S_4$.

As described above, for a reasonable operation a discharge unit 6 is connected between the first and the second end of the clamping capacitor $C_{clamp}$, in order to reset the voltage of the clamping capacitor $C_{clamp}$.

In a full bridge configuration according to FIG. 5, subdivision of the resonant inductances $L_s$, $L_m$ and the transformer $T_1$ into a first subpart "a" and a second subpart "b" is implemented. These subparts must be each of equal value effecting the midpoint voltage of $V_{Cs}$ to be $V_{bulk}/2$ referred to power ground ($-V_{bulk}$). Otherwise the clamping scheme will distort the resonant waveforms leading to unsymmetrical half cycles and therefore unreliable operation. Furthermore, the driving signals of $S_1$ and $S_4$ respectively of $S_2$ and $S_3$ must be equal, i.e. no phase shift operation can be applied. Subparts "a" and "b" can be either independent or magnetically coupled to each other.

In summary, it is to be noted that an improved clamping scheme has been described that concurrently provides for limitation of the resonant capacitor voltage and the resonant current during overload or short circuit conditions as well as for improved hold up time in case of high output power.

An additional benefit of the proposed clamping scheme (for half bridge as well as for full bridge configurations) is that no sensing of the resonant current is required for overload protection. This is due to the fact that—as described above—an overload condition is identified by an increased voltage of $C_{clamp}$ being larger than the safety turn off threshold $V_{turn\_off}$.

| List of reference symbols | |
|---|---|
| $V_{Bulk}$ | bulk voltage source |
| 1, 2 | first and a second input terminal |
| $C_{Bulk}$ | bulk capacitor |
| $S_1$ | first switch |
| $S_2$ | second switch |
| $C_1$ | first resonant capacitor |
| $C_2$ | second resonant capacitor |
| $L_s$, $L_{s\_a}$, $L_{s\_b}$ | resonant inductor |
| $T_1$, $T_{1\_a}$, $T_{1\_b}$ | transformer |
| $L_m$, $L_{m\_a}$, $L_{m\_b}$ | magnetizing inductance |
| 3 | pulse control unit |
| $D_1$ | first diode |
| $D_2$ | second diode |
| 7, 8 | first and second output terminal |
| $Sync_1$, $Sync_2$ | first and second synchronizing component |
| $V_O$ | output voltage |
| $C_{clamp}$ | clamping capacitor |
| $D_3$ | third diode |
| $D_4$ | fourth diode |
| 5 | comparator |
| 4 | pulse inhibit signal |
| 6 | discharge unit |

The invention claimed is:

1. A resonant converter, comprising:
   a first input terminal and a second input terminal (1, 2) in order to connect a voltage source ($V_{Bulk}$),
   wherein a first end of a first switch ($S_1$) is connected to the first input terminal (1),
   wherein a second end of the first switch ($S_1$) is connected to a first end of a second switch ($S_2$),
   wherein a second end of the second switch ($S_2$) is connected to the second input terminal (2),
   wherein a first end of a resonant circuit comprising at least one resonant inductance, at least one resonant capacitor ($C_1$, $C_2$, $C_s$), and at least a primary winding of a transformer ($T_1$, $T_{1\_a}$, $T_{1\_b}$) is connected to the second end of the first switch ($S_1$) and to the first end of the second switch ($S_2$),
   wherein
   a) third diode ($D_3$) is connected in conduction direction from the first end of the first switch ($S_1$) to the first end of a clamping capacitor ($C_{clamp}$),
   b) a fourth diode ($D_4$) is connected in conduction direction from the second end of the clamping capacitor ($C_{clamp}$) to the second end of the second switch ($S_2$), c) a comparator ($5$) is connected to the first and second end of the clamping capacitor ($C_{clamp}$), and d) the comparator ($5$) is connected to a pulse control unit ($3$) in order to control the first switch and the second switch ($S_1$, $S_2$).

2. The resonant converter according to claim 1, wherein a first end of a discharge unit ($6$) is connected to a first end of the clamping capacitor ($C_{clamp}$) and a second end of the discharge unit is connected to a second end of the clamping capacitor ($C_{clamp}$).

3. The resonant converter according to claim 2, wherein the discharge unit ($6$) comprises a switch and a resistor which are connected in series.

4. The resonant converter according to claim 1, wherein at least one discrete inductor is connected in series to the primary winding of the transformer ($T_1$, $T_{1\_a}$, $T_{1\_b}$) in order to define the at least one resonant inductance.

5. The resonant converter according to claim 1, wherein the at least one resonant inductance is defined solely by a magnetizing inductance of the primary winding of the transformer ($T_1$, $T_{1\_a}$, $T_{1\_b}$).

6. The resonant converter according to claim 1, wherein a first end of a first capacitor ($C_1$) is connected to the first input terminal ($1$), a second end of the first capacitor ($C_1$) is connected to a first end of a second capacitor ($C_2$), a second end of the second capacitor ($C_2$) is connected to the second input terminal ($2$), a first diode ($D_1$) is connected in conducting direction from the second end of the capacitor ($C_1$) to the first end of the clamping capacitor ($C_{clamp}$), a second diode ($D_2$) is connected in conducting direction from the second end of the clamping capacitor ($C_{clamp}$) to the first end of the second capacitor ($C_2$), and the primary winding of the transformer ($T_1$), with optionally a discrete inductor ($L_s$) connected in series, is/are connected between the second end of the first switch ($S_1$) and the second end of the first capacitor ($C_1$) as well as between the first end of the second switch ($S_2$) and the first end of the second capacitor ($C_2$).

7. The resonant converter according to claim 1, wherein a first end of a third switch ($S_3$) is connected to the first input terminal ($1$), a second end of the third switch ($S_3$) is connected to a first end of a fourth switch ($S_4$), a second end of the fourth switch ($S_4$) is connected to the second input terminal ($2$), and a second end of the resonant circuit comprising the at least one resonant inductance, the at least one resonant capacitor ($C_1$, $C_2$, $C_s$), and the at least one transformer ($T_1$, $T_{1\_a}$, $T_{1\_b}$) is connected to the second end of the third switch ($S_3$) and to the first end of the fourth switch ($S_4$), wherein the pulse control unit ($3$) is arranged to control the third switch and the fourth switch ($S_3$, $S_4$).

8. The resonant converter according to claim 7, wherein a first subpart of the primary winding of the transformer ($T_{1\_a}$), with optionally a first subpart of a discrete resonant inductor ($L_{s\_a}$) connected in series, is/are connected between the second end of the first switch ($S_1$) as well as the first end of the second switch ($S_2$) and a first end of the resonant capacitor ($C_s$), a second subpart of the primary winding of the transformer ($T_{1\_b}$), with optionally a second subpart of a discrete resonant inductor ($L_{S\_b}$) connected in series, is/are connected between a second end of the resonant capacitor ($C_s$) and the second end of the third switch ($S_3$) as well as the first end of the fourth switch ($S_4$), a first midpoint diode ($D_{11}$) is connected in conducting direction between the first end of the resonant capacitor ($C_s$) and the first end of the clamping capacitor ($C_{clamp}$), a second midpoint diode ($D_{12}$) is connected in conducting direction between the second end of the resonant capacitor ($C_s$) and the first end of the clamping capacitor ($C_{clamp}$), a third midpoint diode ($D_{13}$) is connected in conducting direction between the second end of the clamping capacitor ($C_{clamp}$) and the first end of the resonant capacitor ($C_s$), and a fourth midpoint diode ($D_{14}$) is connected in conducting direction between the second end of the clamping capacitor ($C_{clamp}$) and the second end of the resonant capacitor ($C_s$).

9. The resonant converter according to claim 1, wherein a discrete inductor is connected in parallel to the transformer ($T_1$) respectively that a discrete first subpart of an inductor is connected to the first subpart of the transformer ($T_{1\_a}$) and a discrete second subpart of an inductor is connected to the second subpart of the transformer ($T_{1\_b}$) in order to define the at least one resonant inductance.

10. The resonant converter according to claim 1, wherein a capacitor ($C_{Bulk}$) is connected in parallel to the first input terminal and the second input terminal ($1$, $2$).

11. The resonant converter according to claim 2, wherein at least one discrete inductor is connected in series to the primary winding of the transformer ($T_1$, $T_{1\_a}$, $T_{1\_b}$) in order to define the at least one resonant inductance.

12. The resonant converter according to claim 3, wherein at least one discrete inductor is connected in series to the primary winding of the transformer ($T_1$, $T_{1\_a}$, $T_{1\_b}$) in order to define the at least one resonant inductance.

13. The resonant converter according to claim 2, wherein the at least one resonant inductance is defined solely by the magnetizing inductance of the primary winding of the transformer ($T_1$, $T_{1\_a}$, $T_{1\_b}$).

14. The resonant converter according to claim 3, wherein the at least one resonant inductance is defined solely by a magnetizing inductance of the primary winding of the transformer ($T_1$, $T_{1\_a}$, $T_{1\_b}$).

15. The resonant converter according to claim 2, wherein a first end of a first capacitor ($C_1$) is connected to the first input terminal ($1$), a second end of the first capacitor ($C_1$) is connected to a first end of a second capacitor ($C_2$), a second end of the second capacitor ($C_2$) is connected to the second input terminal ($2$), a first diode ($D_1$) is connected in conducting direction from the second end of the capacitor ($C_1$) to the first end of the clamping capacitor ($C_{clamp}$), a second diode ($D_2$) is connected in conducting direction from the second end of the clamping capacitor ($C_{clamp}$) to the first end of the second capacitor ($C_2$), and the primary winding of the transformer ($T_1$), with optionally a discrete inductor ($L_s$) connected in series, is/are connected between the second end of the first switch ($S_1$) and the second end of the first capacitor ($C_1$) as well as between the first end of the second switch ($S_2$) and the first end of the second capacitor ($C_2$).

16. The resonant converter according to claim 3, wherein a first end of a first capacitor ($C_1$) is connected to the first input terminal ($1$), a second end of the first capacitor ($C_1$) is connected to a first end of a second capacitor ($C_2$), the second end of the second capacitor ($C_2$) is connected to the second input terminal ($2$), a first diode ($D_1$) is connected in conducting direction from the second end of the capacitor ($C_1$) to the first end of the clamping capacitor ($C_{clamp}$), a second diode ($D_2$) is connected in conducting direction from the second end of the clamping capacitor ($C_{clamp}$) to the first end of the second capacitor ($C_2$), and the primary winding of the transformer ($T_1$), with optionally a discrete inductor ($L_s$) connected in series, is/are connected between the second end of the first switch ($S_1$) and the second end of the first capacitor ($C_1$) as well as between the first end of the second switch ($S_2$) and the first end of the second capacitor ($C_2$).

17. The resonant converter according to claim 4, wherein a first end of a first capacitor ($C_1$) is connected to the first input terminal ($1$), a second end of the first capacitor ($C_1$) is connected to a first end of a second capacitor ($C_2$), a second end of the second capacitor ($C_2$) is connected to the second input terminal (2), a first diode ($D_1$) is connected in conducting direction from the second end of the capacitor ($C_1$) to the first end of the clamping capacitor ($C_{clamp}$), a second diode ($D_2$) is connected in conducting direction from the second end of the clamping capacitor ($C_{clamp}$) to the first end of the second capacitor ($C_2$), and the primary winding of the transformer ($T_1$), with optionally a discrete inductor ($L_s$) connected in series, is/are connected between the second end of the first switch ($S_1$) and the second end of the first capacitor ($C_1$) as well as between the first end of the second switch ($S_2$) and the first end of the second capacitor ($C_2$).

18. The resonant converter according to claim 5, wherein a first end of a first capacitor ($C_1$) is connected to the first input terminal (1), a second end of the first capacitor ($C_1$) is connected to a first end of a second capacitor ($C_2$), the second end of the second capacitor ($C_2$) is connected to the second input terminal (2), a first diode ($D_1$) is connected in conducting direction from the second end of the capacitor ($C_1$) to the first end of the clamping capacitor ($C_{clamp}$), a second diode ($D_2$) is connected in conducting direction from the second end of the clamping capacitor ($C_{clamp}$) to the first end of the second capacitor ($C_2$), and the primary winding of the transformer ($T_1$), with optionally a discrete inductor ($L_s$) connected in series, is/are connected between the second end of the first switch ($S_1$) and the second end of the first capacitor ($C_1$) as well as between the first end of the second switch ($S_2$) and the first end of the second capacitor ($C_2$).

19. The resonant converter according to claim 2, wherein a first end of a third switch ($S_3$) is connected to the first input terminal (1), a second end of the third switch ($S_3$) is connected to a first end of a fourth switch ($S_4$), a second end of the fourth switch ($S_4$) is connected to the second input terminal (2), and a second end of the resonant circuit comprising the at least one resonant inductance, the at least one resonant capacitor ($C_1$, $C_2$, $C_s$), and the at least one transformer ($T_1$, $T_{1\_a}$, $T_{1\_b}$) is connected to the second end of the third switch ($S_3$) and to the first end of the fourth switch ($S_4$), wherein the pulse control unit (3) is arranged to control the third switch and the fourth switch ($S_3$, $S_4$).

20. The resonant converter according to claim 3, wherein a first end of a third switch ($S_3$) is connected to the first input terminal (1), a second end of the third switch ($S_3$) is connected to a first end of a fourth switch ($S_4$), a second end of the fourth switch ($S_4$) is connected to the second input terminal (2), and a second end of the resonant circuit comprising the at least one resonant inductance, the at least one resonant capacitor ($C_1$, $C_2$, $C_s$), and the at least one transformer ($T_1$, $T_{1\_a}$, $T_{1\_b}$) is connected to the second end of the third switch ($S_3$) and to the first end of the fourth switch ($S_4$), wherein the pulse control unit (3) is arranged to control the third switch and the fourth switch ($S_3$, $S_4$).

* * * * *